United States Patent [19]
Clark

[11] Patent Number: 4,833,777

[45] Date of Patent: May 30, 1989

[54] METHOD OF MOUNTING BATTERIES ON A BICYCLE

[76] Inventor: John J. Clark, 1421 C., Lincoln, Nebr. 68502

[21] Appl. No.: 153,818

[22] Filed: Feb. 8, 1988

[51] Int. Cl.[4] ............................................. H01R 43/00
[52] U.S. Cl. .................................... 29/854; 180/68.5; 429/98; 429/99; 446/484; 362/72
[58] Field of Search ............... 29/854; 180/65.1, 68.5, 180/220; 362/72; 446/355, 484; 429/98, 99, 157

[56] References Cited

U.S. PATENT DOCUMENTS

| 561,886 | 6/1896 | Hamerschlag | 180/220 X |
| 675,390 | 6/1901 | Keating | 180/68.5 X |
| 4,713,039 | 12/1987 | Wong | 446/484 X |

FOREIGN PATENT DOCUMENTS

| 2124274 | 11/1972 | Fed. Rep. of Germany | 180/68.5 |
| 2050770 | 1/1981 | United Kingdom | 180/68.5 |

Primary Examiner—P. W. Echols
Assistant Examiner—Carl J. Arbes

[57] ABSTRACT

An internal battery mount for bicycle use. The battery is mounted inside the seatpost frame tube, making it safe from theft and road hazards. An expanding plug is used to hold the battery in the frame tube. In addition a provision is made to allow use of the bicycle frame as ground for the batteries. The internal frame mounting is easy to install and remove, with no alteration or damage to the bicycle frame or its paint.

4 Claims, 2 Drawing Sheets

METHOD OF MOUNTING BATTERIES ON A BICYCLE

BACKGROUND-FIELD OF INVENTION

This invention relates to bicycles, specifically to methods of mounting batteries in a frame tube of a bicycle, used with, for example, headlights.

Present methods of mounting batteries on bicycles are inadequate. Current mounts place the batteries in some kind of externally mounted holder, this holder is attached with a clamp of some kind to the bicycle or the batteries are placed in a sack which is mounted under the seat. These placements leave the batteries out in the open. It makes it easy for a thief to pry the holder, with it's relatively expensive batteries, from the bicycle. This exposed mounting of the heavy batteries has to be structurally strong enough to stand up to road shocks and is therefore generaly bulky and relatively heavy. The external mounts detract from the esthetic simplicity of the bicycle.

Objects and Advantages

Accordingly therefore objects and advantages of my invention are, the mounting of batteries on a bicycle so as to overcome the disadvantages of prior mounting methods. To accomplish this I propose a construction which permits the mounting of the batteries within the seatpost frame tube. With the batteries mounted internally instead of externally, the problem of theft is eliminated. Inside the frame tube the batteries are also protected from road hazards and shock. The internal mounting of the batteries leaves the frame of the bike aerodynamically clean and aestheticaly uncluttered. In addition mounting the batteries internaly weighs less than external mounts.

List of Referance Numerals:

1 seatpost frame tube of a bicycle
2 elastic core
3 U shaped metal conductor
4 bolt
5 T-connector
6 spring
7 battery
9 spring
10 L-shaped hook
11 insulated wire
$2^1$ elastic core
$4^1$ bolt
$5^1$ T-connector
P1 bottom expanding contact plug
P2 top expanding contact plug

DESCRIPTION OF DRAWINGS

FIG. 2 shows a top view of the L-hook used on expanding contact plug.

DESCRIPTION OF INVENTION

Figure 1:
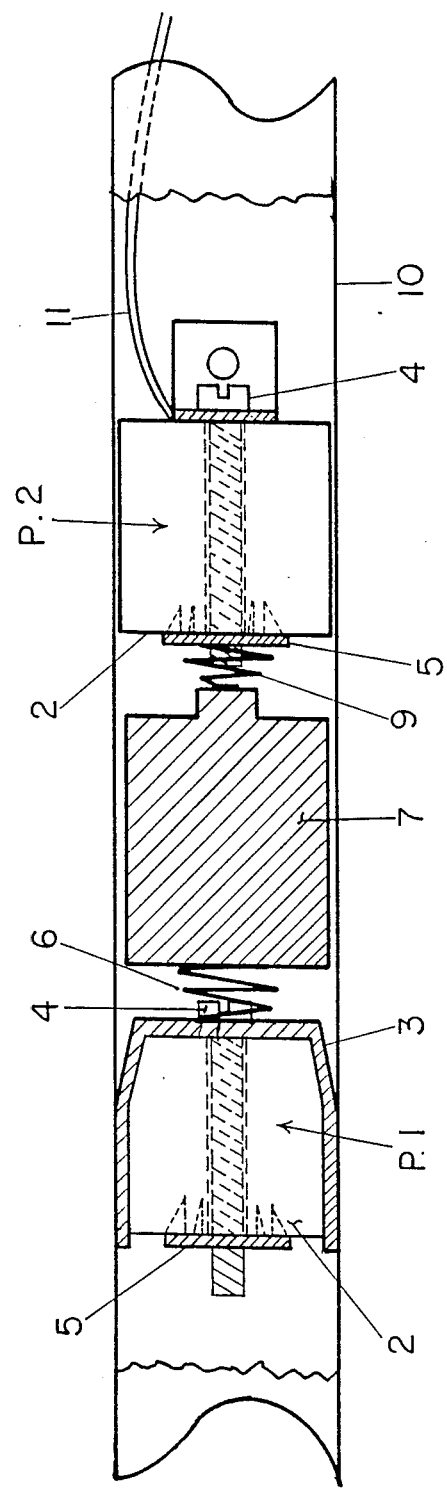
FIG. 1 is a view inside of a bicycle seatpost tube showing relative placement of the parts of my invention when correctly installed in said tube.
Figure 2:
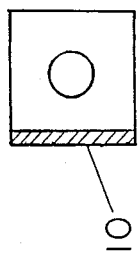
FIG. 2 is the bottom expanding contact plug of my invention shown in side view.
Figure 3:
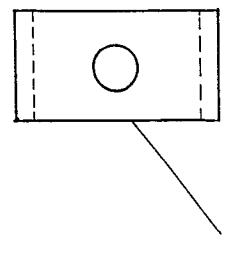
FIG. 3 shows a top view of the U-shaped contact of expanding contact plug P1.
Figure 4:
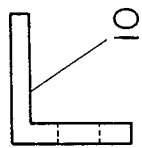
FIG. 4 shows a side view of the L-hook used on P2.
Figure 5:
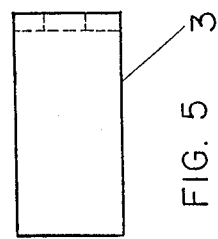
FIG. 5 shows a side view of the U-shaped contact on P1.
Figure 6:
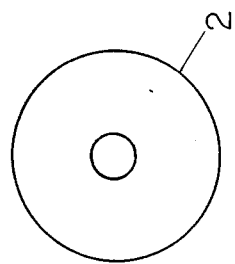
FIG. 6 is a top view of the expansion plug used in P2.

The plug P1 shown in FIG. 1 is mounted in a seatpost frame tube of a bicycle, plug P1 is andelastic core with a U shaped metal connector, 3 placed over the top and contacts the walls of the seatpost frame tube 1. A hole runs through the center of the connector FIG. 2 and the core 2, through this hole runs a bolt 4 attached on the other side of this bolt is a T-nut 5. Wedged under metal conductor 4 is a spring 6. This spring extends up from the plug to contact the battery 7. Another plug P2 is positioned above the batteries 7, metal conducting spring 9, contacts the terminal of the batteries 7, and is wedged under a T-nut $5^1$, a bolt $4^1$, runs through a hole in core $2^1$, and a hole in L-hook 10. L-hook 10 has wedged under it and in electrical contact with it, an insulated wire 11 which then runs out of the seatpost frame tube 1. L-hook 10 also has another hole in it FIG. 2, which when hooked with a stiff wire permits removal of plug P2.

Operation of Invention

The bottom expanding plug P1 is placed in a bicycle to seatpost frame tube 1. The plug P1 is caused to expand and wedge in the frame tube 1 by turning bolt 4. Battery 7 is placed on top of plug P1. This completes electrical contact from the bottom terminal of the battery 7 to the spring 6, the U connector 3 to the frame 1. The top expanding contact plug P2 is placed on top of battery 7, so as to compress both springs 9 and 6. Electrical contact is then made with the top of battery 7, through spring 9 T-nut 5, bolt 4, to insulated wire 11. Thus the frame of the bicycle carries current from one terminal of the battery 7, and insulated wire 11 carries current from the other terminal. At the same time battery 7 is held securely in the frame tube of the bicycle.

Conclusion and Scope of Invention

Thus the reader will see that internal frame mount for batteries on a bicycle provides more security from thieves, more protection to the batteries from road shock or road hazards, and leaves the frame of the bicycle aerodynamicaly efficient and looking uncluttered. It is a system which is easy to install, using only hand tools, and provides definite novel advantages over other methods of battery mounting.

While my above description contains language which may be limitive, these should not be construed as limitations on the scope of the invention, but as exemplification of the preferred embodiment thereof. Many other variations are possible. for example one expanding plug could be used, with a plastic sleeve that encapsulates both it and the batteries. The plastic plug being above the batteries. The batteries being suspended from the one expanding plug. Accordingly the scope of the invention should not be determined by the embodiments illustrated, but by appended claims and their legal equivalents.

I claim:

1. A method of mounting rechargeable or nonrechargeable batteries, within the seatpost frame tube of a bicycle, comprising,
   a seatpost frame tube,
   a battery of proper size to permit placement within said seatpost frame tube,
   an elastic plug of proper size to permit placement within said seatpost frame tube, expanding said elastic plug sufficiently to wedge said plug in said seatpost frame tube, connecting an insulated wire to one terminal of said battery, electrically connecting the other terminal of said battery to the inside wall of said seatpost frame tube, making the frame one of the electrical conductors, running said insulated wire out of said seatpost frame tube, said battery and said elastic plug to be placed in said frame tube in such a manner that when said elastic plug is caused to wedge in said frame tube, said battery will be supported by said plug.

2. The invention of claim 1 wherein the step of connecting said insulated wire to said battery shall consist of a expandable plastic plug with a bolt running through said plug, and a metal spring attached to said bolt such that said spring will contact one terminal of said battery in said frame tube, electricity then being able to pass from said spring, to said bolt then to said insulated wire and out of said frame tube.

3. The invention of claim 1 wherein said battery and said elastic plug shall be incased in a flexible plastic sheath when said elastic plug is caused to expand and wedge in said seatpost frame tube, said battery shall be held in place beneath said elastic plug by said elastic sheath.

4. The invention of claim 1 the step of electrically connecting one terminal of said battery to the wall of said seatpost frame tube shall consist of a spring, said spring to be electrically connected to a metal conductor, said metal conductor to be placed with said elastic plug, such that when said elastic plug is caused to expand said metal conductor shall contact the wall of said seatpost frame tube, electrical contact will then be made from one terminal of said battery to the wall of said seatpost frame tube.

* * * * *